United States Patent [19]
Conti et al.

[11] 4,314,323
[45] Feb. 2, 1982

[54] FEEDER FOR RAPID SHUTDOWN FOR SAFETY DEVICES OF NUCLEAR REACTORS

[75] Inventors: Ruggero Conti; Franco Imperiali, both of Rome, Italy

[73] Assignee: Comitato Nazionale per l'Energia Nucleare, Rome, Italy

[21] Appl. No.: 971,601

[22] Filed: Dec. 20, 1978

[30] Foreign Application Priority Data

Dec. 21, 1977 [IT] Italy ................... 52311 A/77

[51] Int. Cl.³ .......................................... H02M 7/515
[52] U.S. Cl. ................................................ 363/71
[58] Field of Search ................. 307/82; 363/37, 65, 363/71, 72

[56] References Cited

U.S. PATENT DOCUMENTS

| | | | |
|---|---|---|---|
| 3,010,062 | 11/1961 | Van Emden | 363/72 |
| 3,205,424 | 9/1965 | Bates | 363/72 X |
| 3,234,450 | 2/1966 | Jennings | 363/71 X |
| 3,559,030 | 1/1971 | Bussard | 363/71 |
| 3,571,692 | 3/1971 | Andren | 363/72 X |
| 4,042,871 | 8/1977 | Grubbs et al. | 363/37 X |
| 4,062,057 | 12/1977 | Perkins et al. | 363/71 |

FOREIGN PATENT DOCUMENTS 509974 9/1976 U.S.S.R. ................... 363/71

Primary Examiner—William M. Shoop
Attorney, Agent, or Firm—Ladas & Parry

[57] ABSTRACT

A feeder circuit for the rapid shutdown for safety devices in nuclear reactors comprising a controllable rectifier providing a d.c. output from an a.c. input of network frequency; a number of inverters to invert said d.c. output to an alternating current at a frequency higher than that of the network and to elevate the voltage thereof; and an adder to add the currents exiting from such inverters and rectify the current sum. The exit voltages of the inverters are dephased with respect to each other by 180/n, n being the number of the inverters in the feeder.

4 Claims, 10 Drawing Figures

FEEDER FOR RAPID SHUTDOWN FOR SAFETY DEVICES OF NUCLEAR REACTORS

The present invention relates to a feeder circuit designed and realized particularly for feeding the magnets which support the rods of nuclear reactors. The feeder circuit of the present invention has as unique characteristics a rapidity of shutdown, i.e., the rapidity of drop of the output voltage, the order of magnitude of which is a millisecond, as well as the impossibility that any breakdown may prevent the required shutdown.

It is in fact very important that the rods of nuclear reactors be freed to drop into the reactor in the shortest possible time in the case of alarm and that the occurrance of any breakdown or failure does not lead to the impossibility of freeing the rods, being preferable that in the case of breakdown the rods be however freed.

A feeder circuit of this type may also be employed in all those cases where it is indispensable to interrupt a feed voltage, with absolute safety and with notable speed, on the occurrance of determinate operating conditions and in which it is preferable to have an unwanted cutoff to a missed cutoff.

The absolute safety is obtained by structuring the feeder circuit so that any breakdown causes the shutdown and prevents safely the network voltage from arriving at the load.

Furthermore, to minimize the possibility of interruption of the normal functioning of the installation by reason of breakdowns, in addition to an overdimensioning of the feeder circuit, there is provided according to the invention a feeder installation comprising three feeder circuits connected, in logic two on three. According to said logic, the feeder installation comprises three identical feeder circuits connected to the load so that the shutdown of only one of the three does not affect the normal functioning, while the shutdown of two of the three assures the interruption of the operation. Naturally the load must be able to accept such logic. A suitable load is, for example, the safety magnet for the support of rods for nuclear reactors described in Italian Pat. No. 957,627.

A feeder circuit according to the present invention comprises: a controllable rectifier for providing a d.c. output from an a.c. input of network frequency; some inverters for inverting said d.c. output to alternating current at a frequency superior to that of the network and to increase the voltage thereof; and an adder to add the currents exiting from said inverters and to rectify the current sum, the exit voltages of said inverters being dephase between each other to eliminate the peaks of the exit voltage from the feeder circuit derived from the rectification.

The exit voltages of the inverters are out of phase by 180°/n, in which n is the number of the inverters.

In the case described, the inverters are two and the exit voltages are dephased by 90°.

Further, the circuit of the present invention comprises a circuit to control, in a pre-established and not casual manner, the sequence of functioning of the inverters.

Such circuit, operating at very low power, utilizes as its only feed the signal coming from the safety logics of the installation.

A realization of an installation with feeder circuits according to the present invention will now be described, by way of example and not of limitation, with reference to the attached drawings in which.

Figure 1:
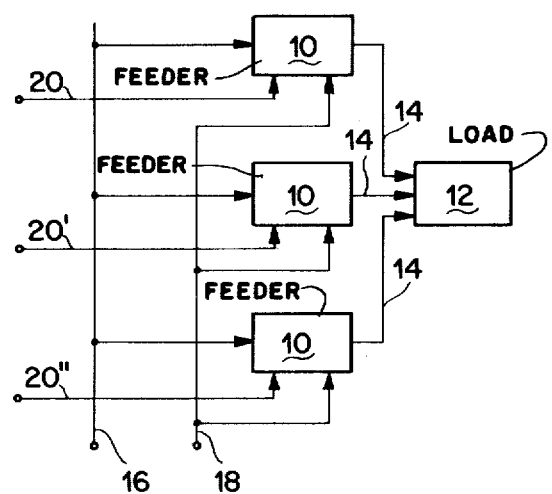
FIG. 1 is a block diagram of the entire feeder installation, realized in logic two on three.

With reference to the drawings, in particular to FIG. 1, it is seen that a feeder installation according to the present invention comprises three feeder circuits 10, connected to a load 12 by means of three lines 14, according to the logic two on three.

Load 12 consists, in the described realization, of a safety magnet for the support of rods of nuclear reactors, as described in Italian Pat. No. 957,627.

Such magnet is constructed as to accept the logic two on three and maintains the support of the rods when two of the three feeder circuits 10 are functioning, while it causes the drop of the rods when only one of the three feeder circuits 10 is in function.

The feeder circuits 10 draw a.c. energy from the distribution network 16, preferably three-phase, and are provided with two control lines 18, 20, respectively for their actuation and shutdown controlled by the safety logic which regulates the nuclear reactor, through lines 20, 20', 20'', which permits the operator to intervene separately in the single devices, for maintenance and control.

Figure 2:
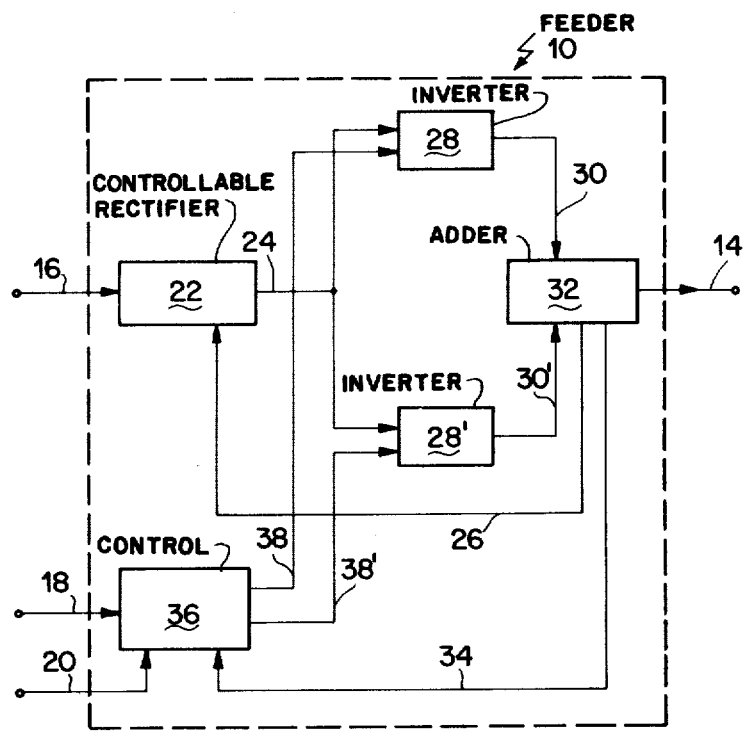
FIG. 2 is a block diagram of a feeder circuit according to the present invention.

With reference now to FIG. 2, each feeder circuit 10 comprises a controllable rectifier 22 of usual design, the d.c. output voltage of which, present on a line 24, is controlled, i.e., regulated within a certain range (for example ±5%), by a signal coming from a line 26. It is to be noted that rectifier 22 requires particular care in the insulation of its transformer and that the maximum possible exit voltage must be limited to the minimum necessary for regulation because of safety problems, as will be better explained hereinafter. It is preferred that rectifier 22 be provided with a current limiter.

Rectifier 22, in the example being considered, is connected to two inverters 28, 28', through the line 24. The outputs of the two inverters 28, 28' go to feed an adder 32, which furnishes the output of the entire circuit 10 on line 14, as well as a control signal on line 26 and a signal confirming the regular functioning on line 34.

Feeder circuit 10 comprises also a control circuit 36 for the inverters 28, 28'. Control circuit 36 has as inputs the two control lines 18, 20, as well as the line 34, and as outputs two lines 38, 38', through which it is connected with the inverters 28, 28', respectively.

Figure 4:
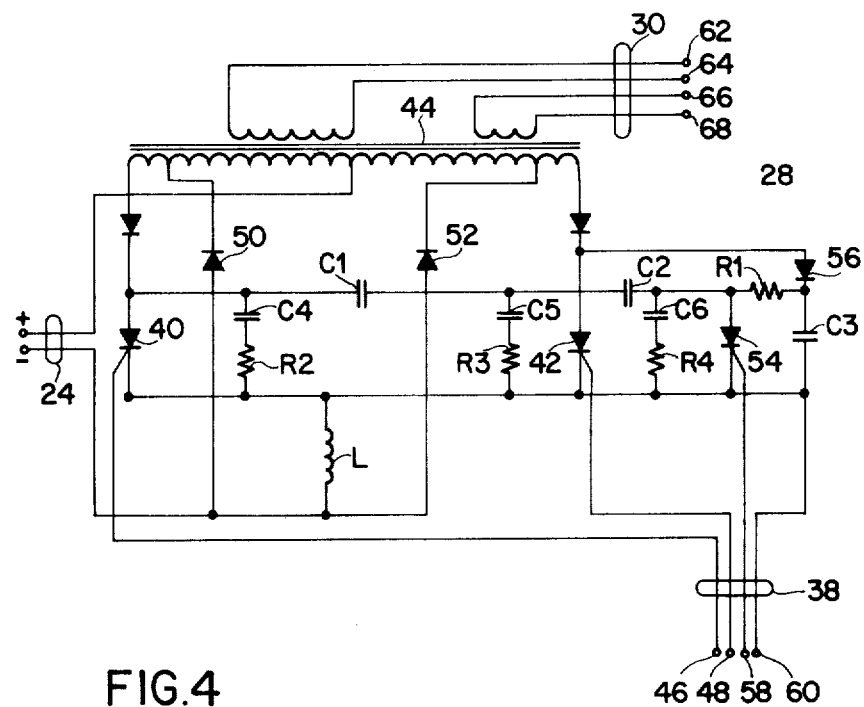
FIG. 4 is a circuit diagram of one of the inverter blocks in FIG. 2.

In FIG. 4 is shown the circuit diagram of the inverter 28. It is noted that the inverter 28' is identical to inverter 28 and therefore it is not shown in detail, nor will it be described in detail, but rather its components corresponding to those of inverter 28 will be indicated with the same reference characters, marked with a prime symbol.

The inverter 28 is essentially a parallel inverter of the Wagner type with energy recovery diodes comprising two silicon-controlled rectifiers (SCR) 40 and 42 and a transformer 44. The operation of said inverter consists of alternately triggering the SCRs 40 and 42 through the respective gate terminals 46 and 48; the triggering of one of the two SCRs causes, through a capacitor $C_1$ and an inductor L, the shutdown of the other, thus generating at the secondary of transformer 44 trapezoidal wave voltages, of an amplitude proportional to the relative ratios of turns, as shown in FIG. 6A for the output of inverter 28 and in FIG. 6B for the output of inverter 28'.

The diodes 50 and 52 are recovery diodes. The serially-connected resistor capacitor groups $R_2$-$C_4$, $R_3$-$C_5$, $R_4$-$C_6$ are networks for limiting the commutation rate.

The SCR 54 has the function of shutting off, through a capacitor $C_2$ and inductor L, the SCR 42 at the end of the cycle during which the shutting off is required. The network consisting of diode 56, of resistor $R_1$ and of capacitor $C_3$ has the function of providing the polarization voltage to capacitor $C_2$.

The gate of the SCR 54 is connected to a terminal 58 and the cathodes of the three SCRs 40, 42 and 54 are all connected to a single terminal 60.

The secondaries of transformer 44 are connected respectively to terminals 62, 64 and 66, 68.

Figure 5:
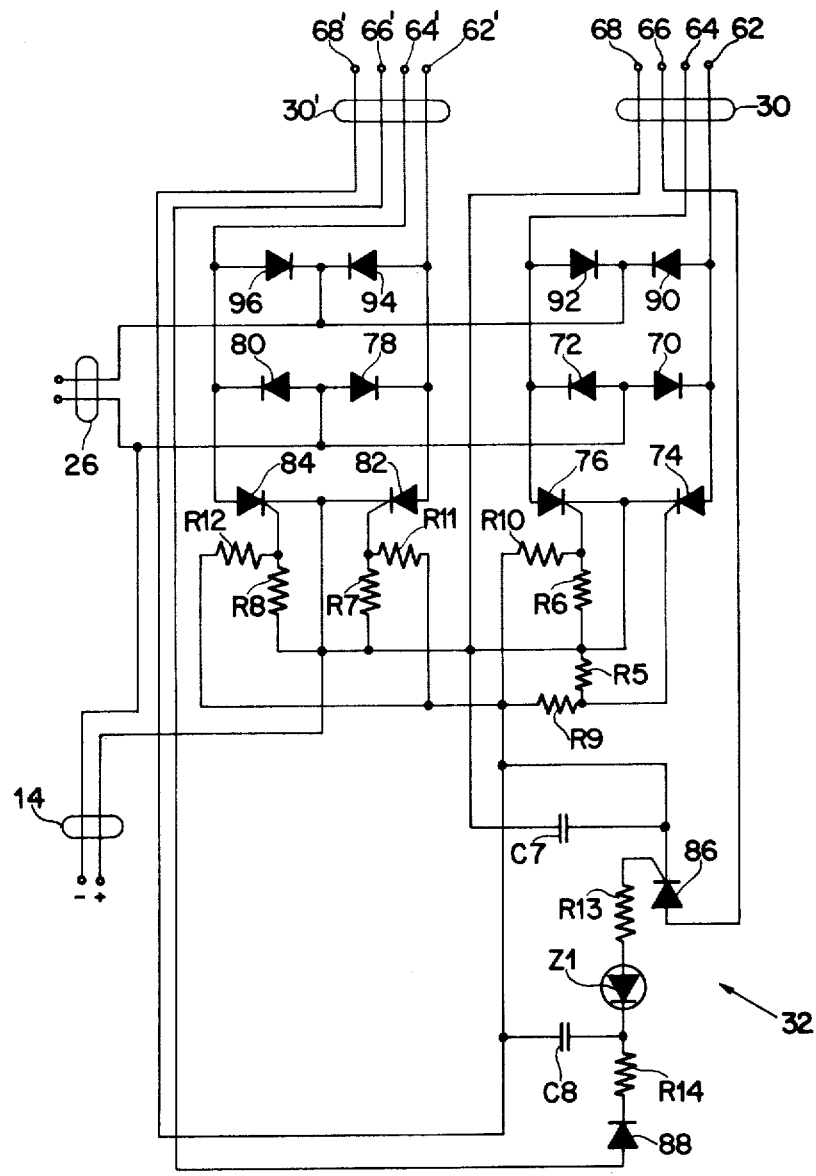
FIG. 5 is a circuit diagram of the adder block in FIG. 2.

The adder 32 of FIG. 5 is composed basically of two bridges of diodes to rectify the voltages coming from transformers 44, 44' of inverters 28, 28', through terminals 62, 64 and 62', 64'. Such bridges are constituted by the diodes 70 and 72 and by the SCRs 74 and 76 for the inverter 28 and by the diodes 78 and 80 and by the SCRs 82 and 84 for inverter 28'. There are used the SCRs in place of the diodes in order to be able to connect the load when the two inverters are at steady state.

Such connection takes place feeding the gate terminals of the SCRs 74, 76, 82, 84, respectively through the resistors $R_9$, $R_{10}$, $R_{11}$, $R_{12}$ and the SCR 86.

In order that the SCR 86 furnishes the necessary triggering current there must be present at the terminals 66, 68 and 66', 68' the voltages coming from the inverters 28 and 28'.

In fact, the voltage at the terminals 66' and 68' permits, through diode 88, resistor $R_{14}$, capacitor $C_8$, zener diode $Z_1$ and resistor $R_{13}$, the firing of the SCR 86, if at the terminals 66, 68 there is present the right voltage. The absence of one of the two voltages results in the non-connection of the load.

The diodes 90, 92 and 94, 96 furnish, through the line 26, to block 22 of FIG. 2, the signal necessary to regulate the feeding voltage.

Figure 6:
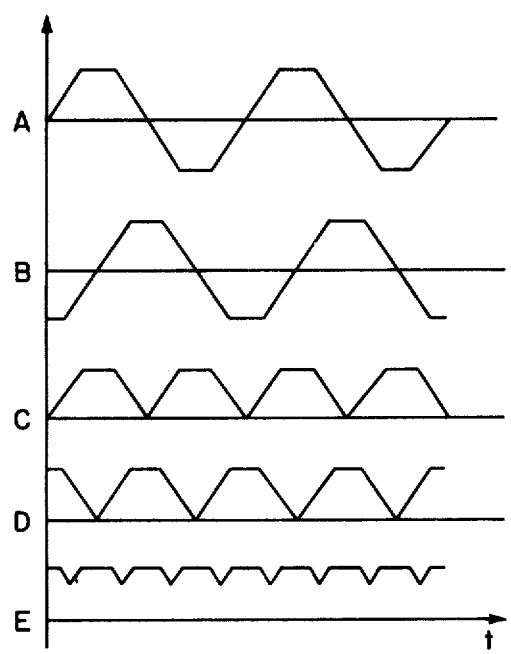
FIGS. 6A to 6E are temporal diagrams of wave forms at various points of the feeder circuit of FIG. 2.

The resistors $R_5$, $R_6$, $R_7$, $R_8$ have the function of avoiding undesired triggerings of the SCRs To obtain the maximum speed of intervention it is not possible to utilize capacitors on the output line 14 of adder 32. To eliminate the peaks due to the rectification of the alternating voltage it is necessary to utilize more inverters, suitably dephased with respect to each other, so that on adding the various rectified alternate voltages, said peaks are practically eliminated. In the realization shown in FIG. 2, there have been utilized two inverters 28 and 28'; FIG. 6 shows, in addition to the outputs of the two inverters 28 and 28', the wave forms which are obtained by rectifying the output of inverter 28 (FIG. 6C), rectifying the output of inverter 28' (FIG. 6D) and finally the wave form of the output voltage of adder 32 (FIG. 6E) which, as has been said, corresponds to the sum of the two rectified alternate voltages.

Naturally the number of inverters may be varied in view of considerations of economic character and of required power; in fact, by increasing the number of inverters there is proportionally increased the output power available, or vice versa, at equal powers, there may be utilized components of lower performance and therefore of lower cost. Obviously the phase relation between the voltages of the various inverters will be selected at 180°/n, where n is the number of inverters, for an optimal operation. In the case of the realization described there are two inverters and therefore a phase shift of 90° between their output voltages.

Figure 3:
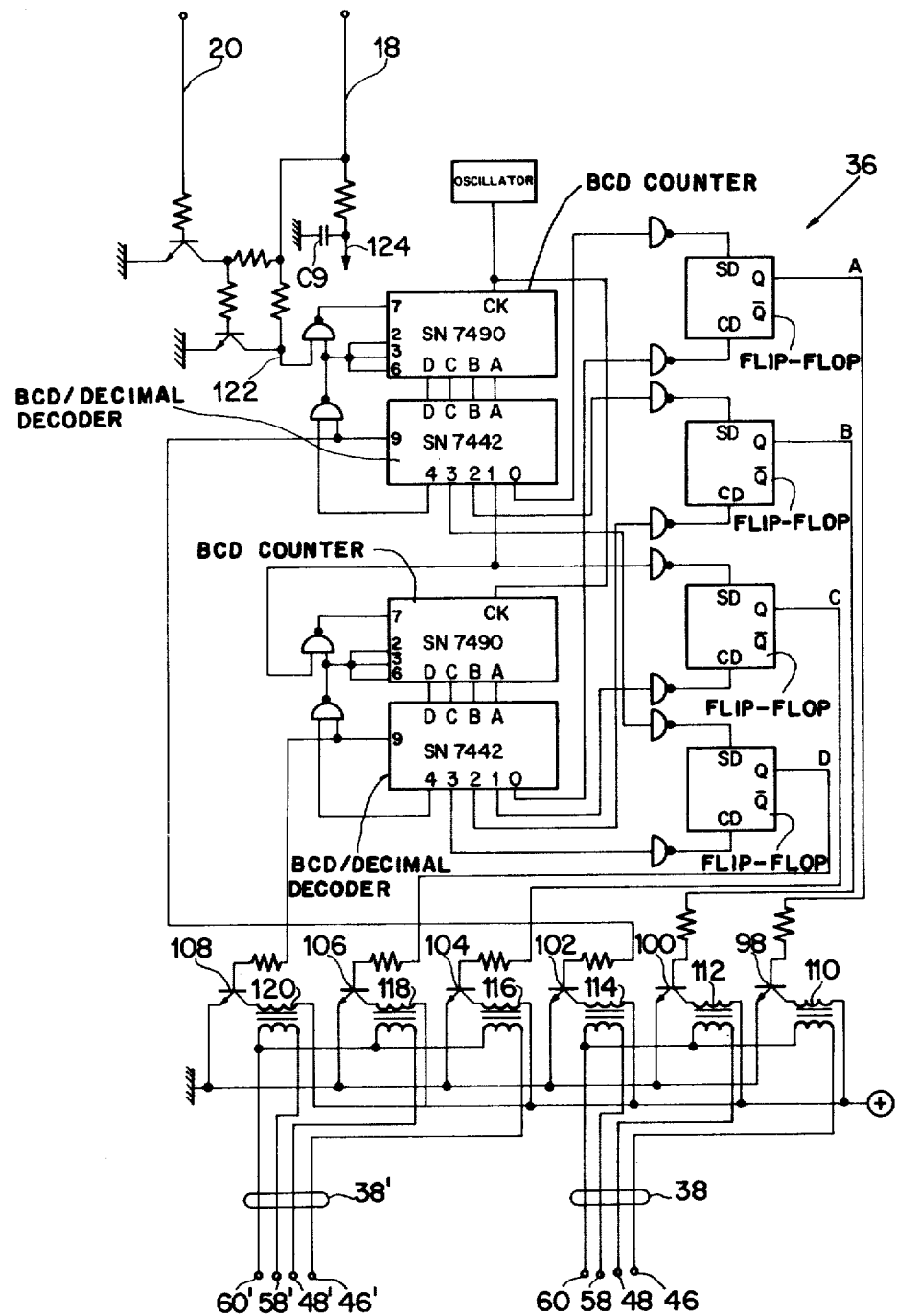
FIG. 3 is a circuit diagram of the control circuit in FIG. 2.

The control circuit 36 of FIG. 3 has the function of sending to the terminals 46, 48 and 58 of inverter 28 and to the corresponding terminals 46', 48' and 58' of the inverter 28' the signal necessary to obtain the 90° phase shift required at the output of the two inverters 28 and 28'.

The operating sequence is the following: with the circuit quiescent and with the control signals at the zero level on lines 20, 20' and 20'' and at the one level on line 18, no signal arrives at terminals 46, 48, 58 and 46', 48', 58'. When the control signal assumes one level on lines 20, 20' and 20'', the circuit of FIG. 3 furnishes the triggering signals to the SCRs of inverters 28, 28', sending impulses in sequence to terminals 46, 46', 48, 48'.

To the terminals 58 and 58' there is not given any signal.

When the control signal assumes again the zero level on the lines 20, 20' and 20'', for example, after a shutdown request by the operator, the circuit continues to function until there is terminated the sequence of impulses to terminals 46, 46', 48, 48' to which follow the simultaneous signals to gate terminals 58 and 58' to shutdown SCRs 54 and 54'. Therefore the circuit returns to the initial conditions in which no signal arrives at terminals 46, 46', 48, 48', 58, 58' of the inverters 28 and 28'.

This sequence is necessary to assure the regular functioning of the inverters.

The logic circuit derives from the equations of state simplified with Boolean algebra. The transistors 98, 100, 102, 104, 106 and 108 have the function of giving power to the control pulses, which arrive at the respective terminals 46, 48, 58 and 46', 48', 58' through six transformers 110, 112, 114, 116, 118, 120. Said transformers serve both to uncouple and to close on very low impedences the control inputs of the SCRs, thus avoiding spurious firings.

The line 10 is connected to the calculator which controls the installation and on line 10 there is always present an electric signal, which is annulled only when there is requested a shutdown through the control apparatus. In such case there is annulled the voltage on line 18 and therefore immediately line 122 is brought to the zero level, which causes the control circuit 36 to stop at the end of the sequence in course.

A line 124 is connected to the supply terminals of the integrated circuits and therefore, after a brief time interval (about 2–3 milliseconds), due to the presence of capacitor $C_9$ and resistor $R_{15}$, from the time in which the voltage on line 18 has been cut off, there is no longer the supply to control circuit 36. In this manner there is obtained an ulterior safety in that auto-oscillations of the circuit are prevented.

As has been said, for maximum safety, the apparatus is structured so that any breakdown causes a shutdown and it is prevented safely of the mains voltage at to the load. This is obtained according to the present invention by utilizing a double feeder composed of rectifier 22 which furnishes the d.c. voltage and of a booster of d.c.

voltage consisting of inverters 28, 28', adder 32 and control circuit 36.

The voltage booster, in which the inverters 28 and 28' transform the voltage from direct to alternating, which is then boosted by means of transformers 44 and 44', serves to give to the load a voltage which is double or triple the primary voltage.

Furthermore, the voltage booster assures the rapid interruption in the voltage (by interrupting the oscillations) and assures that the mains voltages, eventually present at the output of rectifier 22, cannot arrive at the load, since transformers 44 and 44', dimensioned for the frequency of the inverters (about 1 KHz), represent a short-circuit for the mains frequency.

The voltage booster, by dimensioning in a suitable manner the boosting ratio, assures also that, in the case of a short-circuit between the primary and secondary of transformers 44 and 44', the load receives a voltage, in practice that of the output of rectifier 22, insufficient to sustain it.

In other words, any breakdown causes the blocking of the alternating voltage: an eventual short-circuit between the primary and the secondary of one of the transformers 44 and 44' would block the alternating voltage and, even excluding the short-circuit of the primary voltage, would present to the load a voltage insufficient for its functioning. Giving to the alternating voltage the sufficiently high frequency of about 1 KHz, there is obtained a rapidity of intervention, since the shutdown takes place within a cycle, as well as the impossibility than an eventual mains frequency voltage, which would be short-circuited by the transformer, generates an output voltage.

As has been said, to eliminate the peaks due to the rectification of the alternating voltage, according to the present invention, there are utilized more inverters, suitably dephased with respect to each other, so that by adding the various rectified alternating voltages, said peaks are practically eliminated.

Naturally, the various elements indicated in FIG. 2 may be realized in many manners and with different techniques, for example, they may be of the vacuum tube of semiconductor types; in particular, inverters 28, 28' and control circuit 36 may be realized electronically, mechanically or by a combination of both.

It is obvious that other numerous and different modifications may be effected by those skilled in the art to the form of realization shown and described, without departing from the spirit of the invention; it is understood that such modifications fall all in the field of the invention itself.

What is claimed is:

1. A feeder circuit for use in supplying current from its output to rod-supporting electromagnet means of a nuclear reactor, said feeder circuit comprising, in combination:
   (a) a controllable rectifier for providing a regulated d.c. output from an a.c. input of network frequency;
   (b) at least two substantially identical inverters coupled to said controllable rectifier for inverting said d.c. output to an alternating current at a frequency higher than said network frequency and for elevating the voltage thereof;
   (c) a sequence control circuit coupled to said inverters for said inverters for causing the exit currents of said inverters to be dephased with respect to each other by a fixed amount equal to 180°/n, wherein n is the number of said inverters; and
   (d) an adder coupled to said inverters for first rectifying and then adding said exit currents to provide a current sum constituting the output current of said feeder circuit;
   (e) wherein said sequence control circuit, in response to a signal applied to a first input terminal thereof simultaneously with a signal applied to a second input terminal thereof, starts the operation of said inverters in sequence to cause said dephasing of said exit currents of the inverters, which sequence of operation is completed for a cycle and thereafter discontinued when either signal is removed from its respective input terminal.

2. A feeder circuit for use in supplying current from its output to rod-supporting electromagnet means of a nuclear reactor, said feeder circuit comprising, in combination:
   (a) a controllable rectifier for providing a regulated d.c. output from an a.c. input of network frequency;
   (b) at least two substantially identical inverters coupled to said controllable rectifier for inverting said d.c. output to an alternating current at a frequency higher than said network frequency and for elevating the voltage thereof;
   (c) a sequence control circuit coupled to said inverters for said inverters for causing the exit currents of said inverters to be dephased with respect to each other by a fixed amount equal to 180°/n, wherein n is the number of said inverters; and
   (d) an adder coupled to said inverters for first rectifying and then adding said exit currents to provide a current sum constituting the output current of said feeder circuit;
   (e) wherein each inverter is a parallel inverter of the Wagner type for generating a trapezoidal wave voltage and includes, at its input, two SCR's alternately triggerable by said sequence control circuit and, at its output, a voltage step-up transformer; and
   (f) wherein the frequency of the alternating current produced by each inverter is sufficiently higher than said network frequency that said voltage step-up transformer is substantially a short circuit with respect to said network frequency, thereby ensuring that network power cannot reach the feeder circuit output.

3. The feeder circuit of claim 1 or 2 wherein the inverters are two and wherein their exit currents are dephased by 90°.

4. The feeder circuit of claim 1 or 2, wherein it is one of three identical feeder circuits of a three-phase feeding installation connected to a load according to the logic two on three.

* * * * *